Patented May 24, 1927.

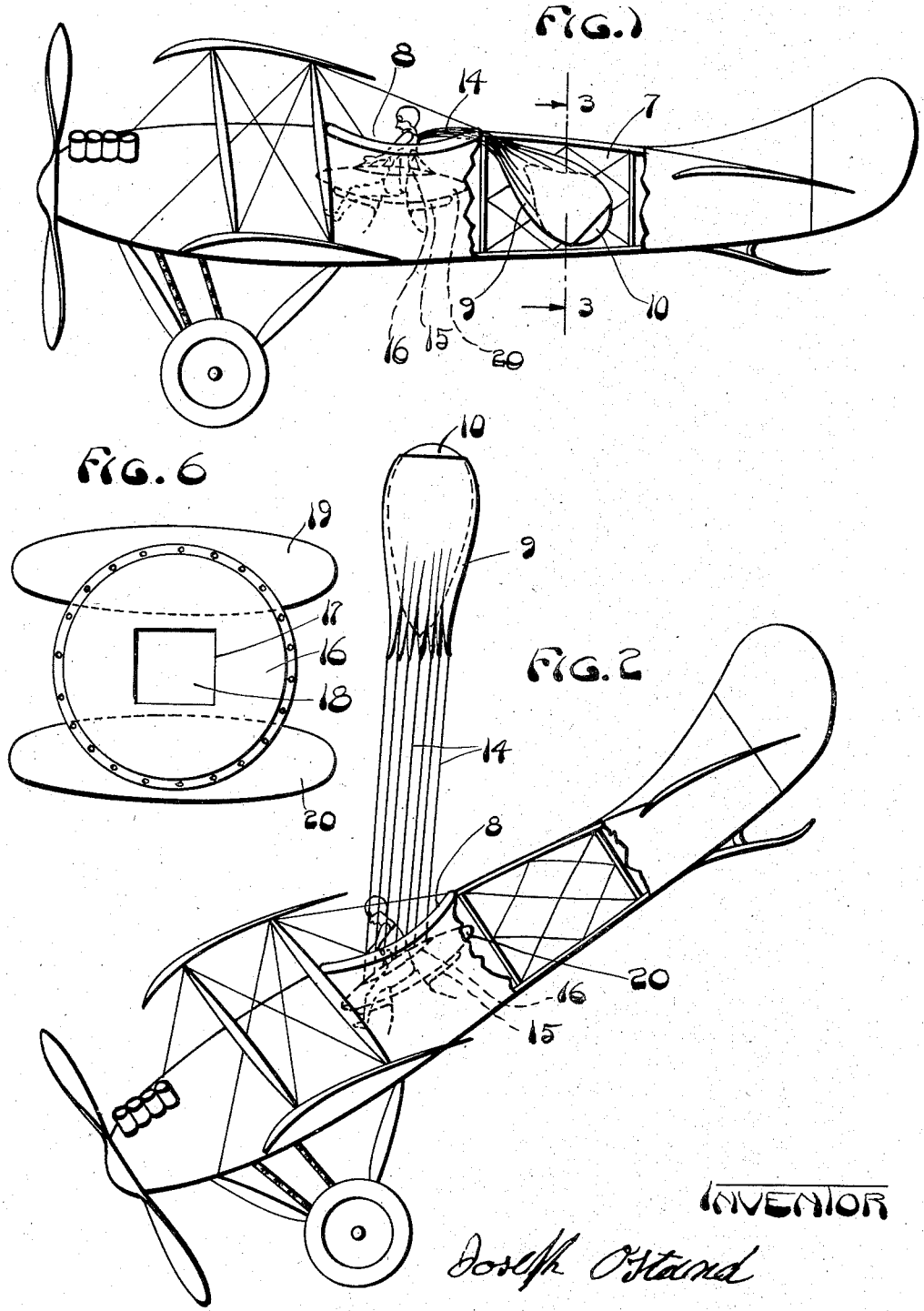

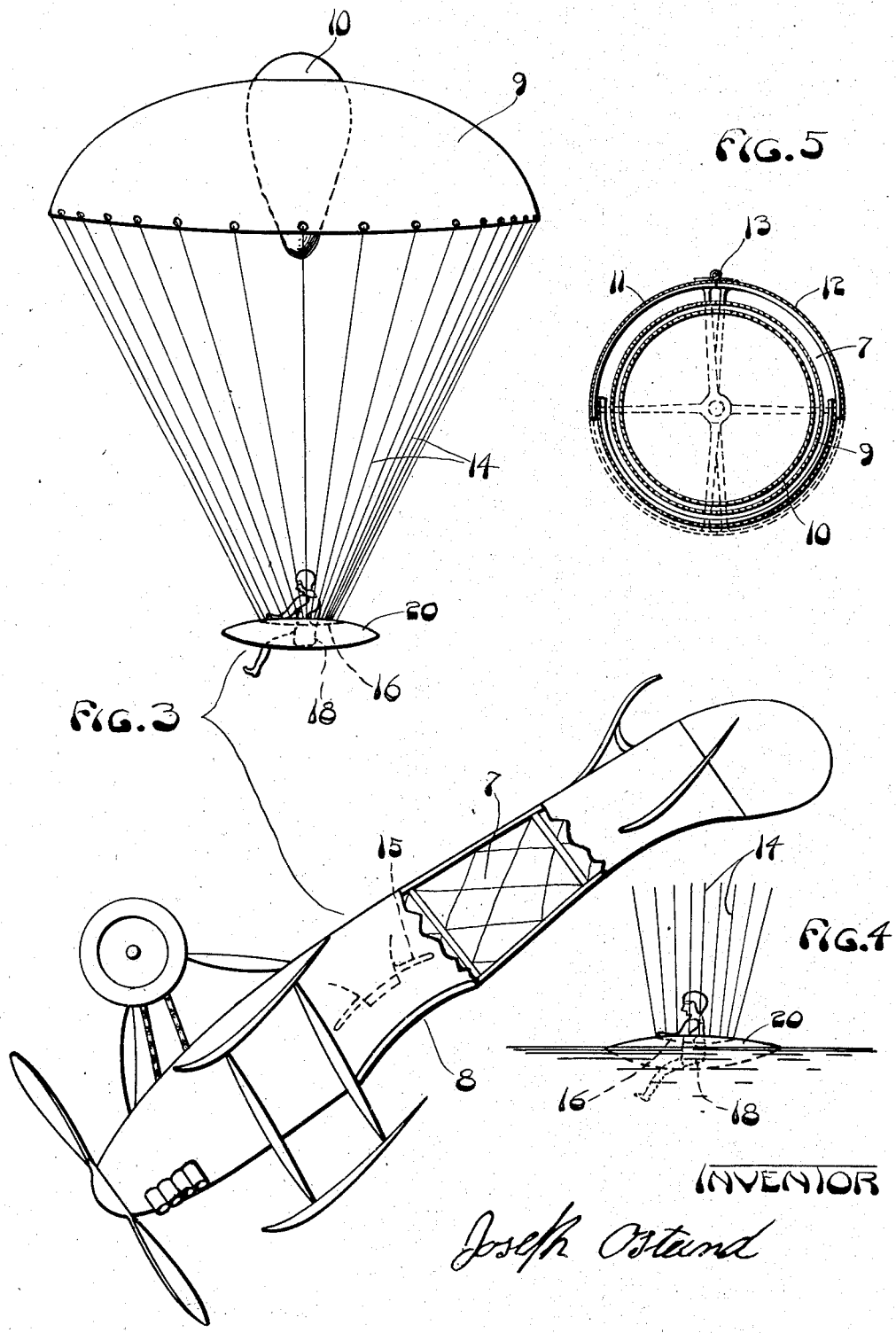

1,630,211

UNITED STATES PATENT OFFICE.

JOSEPH OSTAND, OF CINCINNATI, OHIO.

AIRCRAFT SAFETY DEVICE.

Application filed February 3, 1927. Serial No. 165,573.

This invention is particularly designed with the object of adapting itself to use in connection with any type of aircraft for the especial saving of life in the event of accident.

A further object is to produce a safety device wherein a parachute principle is employed, but wherein a novel form of opening device for assuring the prompt opening of a parachute, is employed together with means to still further assist in the preservation of life after the person so provided has reached the earth's surface.

These and other objects are attained in the device described in the following specification and illustrated in the accompanying drawings, in which:—

Fig. 1 is an elevational view showing the flight position of an airplane equipped with a safety device embodying my invention.

Fig. 2 is a view showing the airplane of Fig. 1 in the act of getting beyond the control of the pilot, with the released safety device in the act of saving the pilot.

Fig. 3 is a composite view showing the airplane of Figs. 1 and 2 completely out of control and the pilot safely descending to the earth with my safety device taking care of him.

Fig. 4 is a view showing how my device will also act to save the person in the event of alighting in water.

Fig. 5 is a somewhat enlarged transverse sectional view taken on the line 3—3 of Fig. 1.

Fig. 6 is a somewhat enlarged plan view of the portion of the device in which the aviator sits and which immediately surrounds his person.

My invention contemplates the utilizing of a compartment 7 in which portions of the safety device are contained under normal flying conditions, other parts thereof being contained in the cockpit 8 with the aviator.
The portions contained in the compartment 7 consists of the parachute parts. These are the parachute proper 9 and a parachute expander 10 which performs the function of securing a prompt opening of the parachute as well as assuring that it is clear of entanglements with the chassis, wings or other parts of the airplane. The novelty of this balloon-parachute combination lies in so positioning and securing the expander 10 within a port or centrally located opening in the parachute 9 that the entire parachute when released from the compartment 7 will be lifted to the position shown in Fig. 2 with initial opening impulse or tendency thus given to the parachute by reason of the rotund shape of the balloon.

Now, as to the compartment 7, I have provided that it be arranged for opening in a manner much resembling the opening of a roll top desk, or similar structure. This idea has been shown in one form in Fig. 5, in which one section 11 is held in closed position with a cooperating section 12 by a suitable latch 13 which is controllable from the pilot's cockpit. When this latch is released these sections drop thus opening the compartment to release the balloon and its expanding but clinging parachute therefrom, dotted lines showing this dropped or open position.

Then, connecting the parachute 9 with the device located in the cock pit, are the many or usual small ropes or cables 14. These are disposed somewhat as shown in Fig. 1. In the cock pit is the other portion of the device, which rests upon a suitable support or saddle 15. This portion of the device consists of three elements. One of these is the round and somewhat doughnut shaped element or buoy 16, to the periphery of which the cables 14 of the parachute are attached in spaced relation. Centrally of this buoy a hole or opening 17 is located, a canvas or other convenient light and strong seat 18 being located therein. The aviator sits upon this and the buoy which in turn suports the seat is attached to cigar shaped buoys 19 and 20 which are located to the sides of the aviator. It is these buoys 19 and 20 which preferably rest upon the saddle 15 so that the tout ensemble may be easily lifted from the saddle in the event of accident such as I have attempted to illustrate.

Now, the function performed by the saddle supported portions of the safety device, is rather unique. Of course all the elements 16, 19 and 20 are preferably inflated with the same buoyant gas as is contained in the balloon-parachute expander, which lightens the burden of the parachute and eases the descent of the aviator, without subjecting the aviator to severe jolts and shocks physically. However the principal function performed by this buoy structure is that of saving the aviator from drowning in the event he alights in water. This I have shown in Fig. 4. In fact he is lowered upon the water surface easily and floats thereon in the position he occupied while in descent. Of course, the parachute becomes somewhat deflated upon reaching the earth, but the balloon-parachute expander 10 supports the parachute in the air, thus preventing it from falling upon the floating aviator and entangling him.

Having thus described my invention what I claim is:—

1. An aircraft safety device comprising a parachute, a balloon secured within and at the apex of the parachute, adapted to support the parachute in partially expanded condition previous to complete expansion thereof, and an aviator-supporting buoy attached to the parachute, said buoy consisting of a substantially annular seat supporting inflated element, and an elongated inflated element attached thereto and in supporting relation thereto to each side thereof, attachment of said aviator-supporting buoy being effected by cables in spaced relation about the rims of and the annular inflated element.

2. An aircraft safety device comprising a parachute, a ballon secured within and at the apex of the parachute, adapted to support the parachute in partially expanded condition previous to complete expansion thereof, and an aviator-supporting buoy attached to the parachute, said buoy consisting of a substantially annular seat supporting inflated element, and an elongated inflated element attached thereto and in supporting relation thereto to each side thereof, attachment of said aviator-supporting buoy being effected by cables in spaced relation about the rims of and the annular inflated element, a containing compartment behind the aviator, closed by arced doors and operated by the aviator for opening and closing, for releasing the balloon-parachute from said compartment or for holding same in locked position.

In witness whereof, I affix my signature.

JOSEPH OSTAND.